United States Patent [19]

Stein

[11] 4,247,761
[45] Jan. 27, 1981

[54] ARRANGEMENT FOR FOCUSING THE IMAGE OF AN OBJECT ONTO AN IMAGE PLANE

[75] Inventor: Karl-Ulrich Stein, Munich, Fed. Rep. of Germany

[73] Assignee: Siemens Aktiengesellschaft, Berlin & Munich, Fed. Rep. of Germany

[21] Appl. No.: 21,077

[22] Filed: Mar. 16, 1979

[30] Foreign Application Priority Data

Mar. 31, 1978 [DE] Fed. Rep. of Germany ....... 2813915

[51] Int. Cl.³ .............................................. G01J 1/20
[52] U.S. Cl. ...................................... 250/201; 354/25
[58] Field of Search .................. 250/204, 201; 354/25; 356/4

[56] References Cited

FOREIGN PATENT DOCUMENTS 2553658 1/1977 Fed. Rep. of Germany .

OTHER PUBLICATIONS

Popular Photography, 1976, No. 1, p. 94.
Sequin et al., "Charge Transfer Devices" Academic Press, New York, 1975, pp. 1-18.
IBM Technical Disclosure Bulletin, vol. 16, No. 1, Jun. 1973, pp. 173-174.

*Primary Examiner*—David C. Nelms
*Assistant Examiner*—Darwin R. Hostetter
*Attorney, Agent, or Firm*—Hill, Van Santen, Steadman, Chiara & Simpson

[57] ABSTRACT

The invention relates to an arrangement for automatically focusing the image of an object, obtained by an objective lens system onto an image plane, wherein a setting device is provided which is controlled by photoelectric sensors and which determines the optimum distances of the objective lens system from the image plane. In accordance with the invention, a CTD image sensor is disposed in the image plane, the read-out signals of which are obtained for a sequence of objective settings, integrated and compared with one another. The time or point of occurrence of the greatest integrated signal is determined and coded into a signal which indicates the interval of time from the beginning of the setting sequence with such signal being supplied to the setting device. An arrangement in accordance with the invention is particularly suitable for use in photographic camera range measuring devices and speed measuring devices.

14 Claims, 4 Drawing Figures

ARRANGEMENT FOR FOCUSING THE IMAGE OF AN OBJECT ONTO AN IMAGE PLANE

BACKGROUND OF THE INVENTION

The invention relates to an arrangement for focusing the image of an object onto an image plane, wherein the image is derived from an objective lens system, adapted to be adjusted by a setting device which changes the distance of the objective, or a portion thereof, with respect to the image plane.

The magazine "Popular Photography", Vol. 78, No. 1, 1976, page 94 left-hand column, line 24 to the next to last line, it is generally indicated that it is possible to provide an image detector, which is supplemented by an electrical circuit, to form a contrast measuring device which may be employed to set the range of a photographic camera relative to an object. The image detector is to contain a plurality of individual photo-cells, the electrical signals of which are scanned sequentially. The contrast measuring device could be further utilized to produce an adjusting signal which would influence the focal distance setting of the camera objective lens system.

The object of the invention is to provide a practical solution, which can be achieved in a simple manner, to the problem of automatically controlling an objective lens system to effect the focusing of the image of an object in an image plane. Proceeding from an arrangement, such as above referred to, this is achieved in the present invention by disposing a CTD (Charge-transfer-device) image sensor in the image plane, which sensor possesses a number of image points aligned to a part of the image, and in which the output of the CTD image sensor, provided for the sequential read-out of the image points, is connected to an evaluating circuit which, for a sequence of discrete values lying within a given range, forms in each case read-out signals which correspond to the mutual contrast of the read-out image points, with such read-out signals being integrated in the evaluating circuit. The latter may be provided with an output at which an adjusting signal is supplied which may be utilized to adjust the objective lens system to the distance assigned to the integrated read-out signal having the greatest magnitude, or may be utilized to indicate the distance of the object.

The advantage achieved in the present invention, in particular, resides in the fact that the CTD image sensor can be monolithically integrated together with the individual components of the evaluating circuit on a semiconductor substrate, to form a semiconductor module which effects the focusing and which can be easily accommodated in various devices which employ focusing, without materially or even noticeably increasing the space requirement.

BRIEF DESCRIPTION OF THE DRAWINGS

In the drawings which illustrate preferred exemplary embodiments of the invention.

DETAILED DESCRIPTION OF EXEMPLARY EMBODIMENTS

Figure 1:
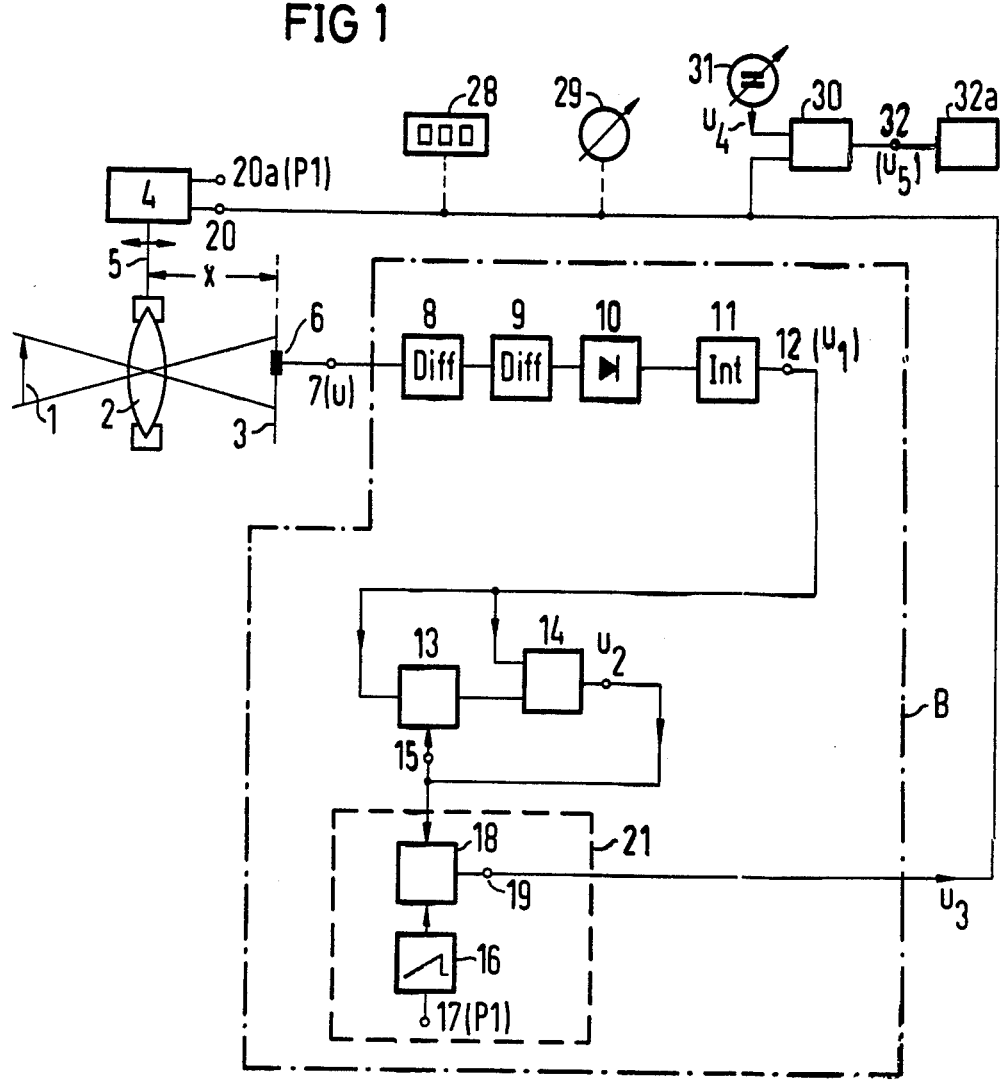
FIG. 1 schematically illustrates a first example.
Figure 3:
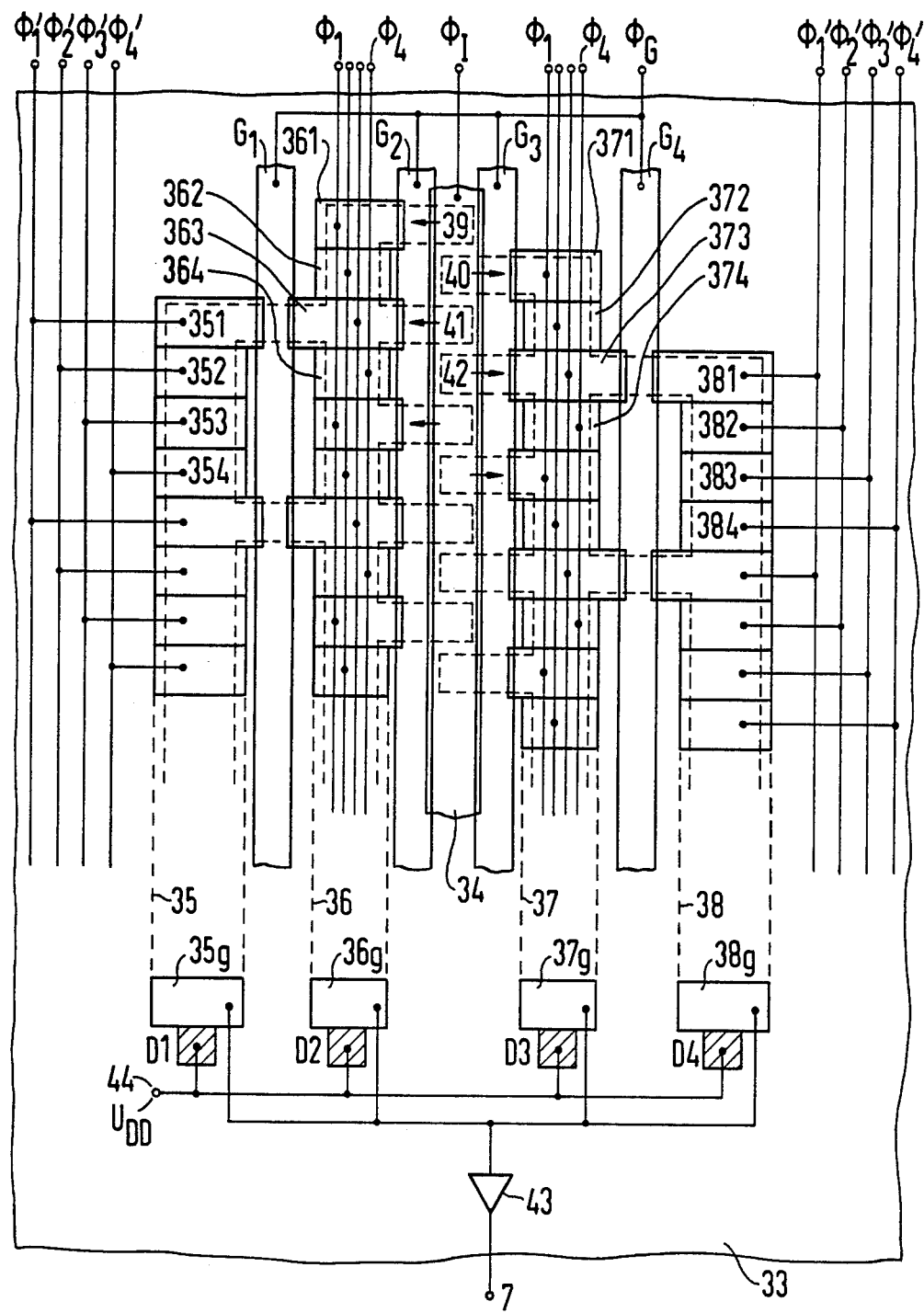
FIG. 3 is a plan view of a basic CTD image sensor which may be employed in the exemplary embodiments.

Referring to the drawings and more particularly to FIG. 1, an object 1 is to be reproduced by means of an objective lens system 2 in an image plane 3. In connection with the focusing of the image, the distance x between the objective lens system 2, or a portion thereof, and the image plane 3 is set to an optimum value by means of an adjusting device 4, coupled to the lens system 2 by means of a suitable actuating element 5 represented merely by a line. Stationarily mounted in the image plane 3 is an image sensor 6 which, as hereinafter described in detail with reference to FIG. 3, is in the form of a charge transfer device and possesses a plurality of image points which are aligned with a portion of the image of the object 1. Adjoining image points of the sensor preferably possess a mutual spacing which is on the order of the resolution of the objective lens system 2. The output 7 of the image sensor is adapted to supply electrical signals formed in the individual image points, which are dependent upon the particular local illumination, and are sequentially read out. For a specific distance x, a read-out signal u is produced which, following a two-fold differentiation in differentiator stages 8 and 9, and subsequent rectification in a rectifier stage 10, is supplied to an integrator 11. A read-out signal $u_1$, which is integrated over the read-out image points, appears in the form of a d.c. voltage and represents a measure of the contrast between the read-out image points.

In dependence upon a sequence of consecutively determined differing values of x which lie within a given range, in the manner heretofore described, a sequence of assigned integrated read-out signals $u_1$ is formed and supplied to the signal input of a first scanning stage 13 and the first input of a comparator 14. A signal at the control input 15 of the scanning stage 13 causes in the first occurring signal $u_1$ to be scanned, stored in the stage 13, switched through to the output of the latter, and supplied to the second input of the comparator 14. If a second signal $u_1$ now occurs, which is greater than the first signal, there is formed in the comparator 14 an output signal $u_2$ which is supplied to the stage 13 by means of its control input 15, as a result of which such stage scans the larger signal $u_1$ and supplies it to the second input of the comparator 14. Each signal $u_1$, which is greater than each such signal preceding it in time within the same setting sequence, is thereby able, as a result of the control action of the comparator 14 upon the stage 13, to displace the smaller signal $u_1$ previously stored therein and serves as a new reference signal for subsequent comparison operations which take place in the comparator 14.

At the end of a specific setting sequence, the stage 13 stores the integrated read-out signal $u_1$ possessing the greatest amplitude. If there is provided a generator 16 which is triggered in synchronism with the start of the setting sequence, and which subsequently produces a rising or falling voltage curve, a signal $u_2$ will be formed upon the occurrence of the signal $u_1$ of greatest magnitude, to effect the scanning and storage of the amplitude value $u_3$ of the generator voltage, prevailing at such time in the second scanning stage 18, which follows the action of the generator 16 and whose control input is supplied with the signal $u_2$.

The signal $u_3$ thus represents a measure of the distance x corresponding to the maximum integrated read-out signal $u_1$ and thus the maximum contrast between the sequentially read-out image points. The signal $u_3$, at the output 19 of the second scanning stage 18, is supplied to a control input 20 of the setting device 4 and thus, at the end of the setting sequence involved, effects the setting of the objective lens system 2 at the x-value at which maximum contrast between the image points was previously established. Thus, the image of the object 1 projected on the image plane 3 has been automatically focused.

In accordance with a preferred further development of the invention, following each automatic setting to the distance x which has been determined as the optimum, a new setting sequence to the x-values which are possible within the given range is automatically initiated. It is thereby possible to control the distance x required for optimum focusing with respect to an object 1 which moves relative to the objective lens system 2. However, this is subject to the condition that the relative speed between the object 1 and lens system 2 should not exceed the limit value governed by the duration of a setting cycle.

Figure 2:
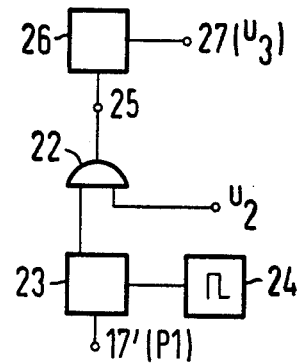
FIG. 2 schematically illustrates a sub-circuit of a second example.

In a second exemplary embodiment of the invention, the circuit illustrated in FIG. 1 may be generally employed with the exception that the sub-circuit outlined by the broken line 21 is replaced by the circuit illustrated in FIG. 2. In this particular embodiment, the adjusting signal $u_3$ is produced in digital form. In this case, the output signal $u_2$ of the comparator 14 is supplied to the first input of a gate circuit 22 whose second input is connected to a counter 23. Following the occurrence of a trigger pulse at the terminal 17', the counter will count timing pulses supplied by a pulse generator 24, and the count reached at the occurrence of a signal $u_2$ is transferred over the gate circuit 22, as an addressing signal, to the address input 25 of a store 26. The signal value, so addressed, in store 26, is then transferred over the input 27, as a digital adjusting signal $u_3$, to the control input of the setting device 4 of FIG. 1. The lines extending between the parts 23, 22, 26 and 4 would be multi-wire conductors or lines in accordance with the digital values which are to be transmitted.

The embodiments of the invention illustrated in FIGS. 1 and 2, which have been described, can be advantageously employed in photographic cameras and the like to achieve an automatic range setting of an object which is to be photographed. In this case, the lens system 2 represents the camera lens system whereas the image plane 3 represents the film plane for light-sensitive material. In addition to setting the focusing range of the camera, the adjusting signal $u_3$ can also be advantageously employed to indicate the distance of the object 1 by means of a suitable digital display device 28 or an analogue display device 29, as the case may be.

A further possibility in the range analysis may involve the comparing, in a comparator 30, the adjusting signal $u_3$ with a reference signal $u_4$ supplied by a voltage source 31 which, for example, may be adjustable, whereby a signal $u_5$ will appear at the output 32 of the comparator 30 on the existence of voltage equality at the output, indicating the fact that the object 1 has reached a specified distance from the objective lens system 2. If a double comparison is carried out between the adjusting signal $u_3$ and two reference signals $u_4$ of different values, in the event of movement of the object 1 a speed measurement can be derived from the time interval between the two occurring signals $u_5$. It is expedient to measure the interval of time in digital form, for example by a time measuring device 32a which follows the output 32 of the comparator 30.

It will be appreciated that the arrangement in accordance with the invention can also be utilized as a range measuring device or a speed measuring device of a more general nature in which no photographic analysis of the image of the object 1 is derived from the objective lens system 2. The significance of the image plane 4, in this case, relates remerely to the location of the CTD image sensor 6, whereas the setting of the device 4 is carried out only in the form of the setting sequence by means of which the signal $u_3$ is formed. Thus, there would be no further setting of the device 4 by means of the signal $u_3$ to a value of x which is the optimum for the focusing of the image of the object 1 in the image plane 3. Consequently, the signal $u_3$ formed during the setting sequence is not supplied to the input 20 of 4, but to the devices 28 to 33. In these devices, the range of the object 1 is then displayed as previously described, with the aid of the display devices 28 or 29, or the speed is displayed by means of the time measuring device 32a.

It will also be appreciated that it is additionally possible to obtain switching commands from the signal $u_3$, or of one or more signals $u_5$. Such possibility can be employed, for example, in cases involving position monitoring of mobile objects 1 which are to be processed in an automatic production device, wherein the movement of the workpiece 1 is halted by a switching command when a predetermined desired position is reached.

Speed measurements either with or without photographic analysis advantageously can be utilized for traffic monitoring purposes and the like.

The circuit stages 8, 9, 10, 11, 13, 14, 16 and 18 which can also be considered as parts of the evaluating circuit B, can be constructed in a relatively simple fashion in integrated circuit technology and can be readily assembled to form a monolithic semiconductor module.

The same is also true of the circuit components 22, 23, 24 and 26 which replace the sub-circuit portion 21 of FIG. 1.

Referring to FIG. 3 which is a plan view of a preferred embodiment of a CTD image sensor, designated by the reference numeral 33, which is integrated on a semiconductor substrate comprising, for example, N-conducting silicon. The substrate surface is covered by an electrically insulating layer which, for example, may comprise $SiO_2$ and which has considerably less thickness within the broken lines 33a than exteriorly thereof. The thinner areas of this layer may also be referred to as gate-oxide zones, whereas the thicker zones may be referred to as field oxide zones. Above the insulating layer is disposed a central electrode 34 at one side of which are rows of electrodes 35 and 36 and at the opposite side of which are rows of electrodes 37 and 38. The electrodes are metallically conductive structures which, may comprise, in particular, portions of an electrically conductive coating applied to the entire surface which, for example, may comprise polycrystalline, highly doped silicon, or may be a metal layer, as for example aluminum. The electrode 34 and the rows of electrodes 35 to 38 may be produced in conventional manner, aa for example, by utilization of a series of photolithographic steps employing masks which define the outlines of the individual structures.

Those points of the semiconductor substrate 33 lying beneath the thin oxide zones and covered by the electrode 34, represent individual image points 39, 40, 41, 42, etc. of the image sensor, and as such points are disposed in a line, an image sensor of this type is referred to as being linear. The electrodes 35 to 38 each comprise individual, closely adjacent electrodes 351, 352, 353, 354 ... 361, 362, 363 ... etc. each of which are aligned with individual image points 39, 40 etc. Between the rows 36, 37 of electrodes 34 are disposed transfer-gate-electrodes $G_1$, $G_2$ which are so disposed that they slightly laterally overlap the firstmentioned electrodes but are electrically insulated therefrom by an intermediate insulating layer. Likewise, between the rows 35 and 36 of electrodes and between the rows 37 and 38 of electrodes are arranged further transfer-gate-electrodes $G_1$ and $G_4$ respectively. The electrode 34 is connected over a terminal to a pulse voltage $\phi_I$, while the transfer-gate-electrodes $G_1$ to $G_4$ are connected over a common terminal to a pulse voltage $\phi_G$.

Each fourth electrode 361, 365, etc. of the row 36 is connected over a common line to a pulse voltage $\phi_I$, while each fourth electrode 362, 366 is connected to a common line which carries a pulse voltage $\phi_2$. In like manner each fourth electrode 363 etc. is connected to a line carrying the pulse voltage $\phi_3$ and each fourth electrode 364 etc. is connected to a line carrying the pulse voltage $\phi_4$. Similarly, the individual electrodes of row 37 are connected to the pulse voltages $\phi_1$ to $\phi_4$, while the electrodes of rows 35 and 38 are connected to the pulse voltage $\phi_{1'}$ to $\phi_{4'}$.

The electrodes of each row 35 to 38 form part of a charge transfer device pulsed by the pulse voltages $\phi_1$ to $\phi_4$ and $\phi_{1'}$ to $\phi_{4'}$. The electrodes 35g to 38g, illustrated at the bottom end of each row of electrodes, represent so-called "floating gate" electrodes which are free of the pulse train voltages but are connected to a common input of an amplifier 43, with such electrodes being followed at the output-side by diffusion zones D1 to D4, which are connected over a common terminal 44 to a drain voltage $U_{DD}$.

Figure 4:
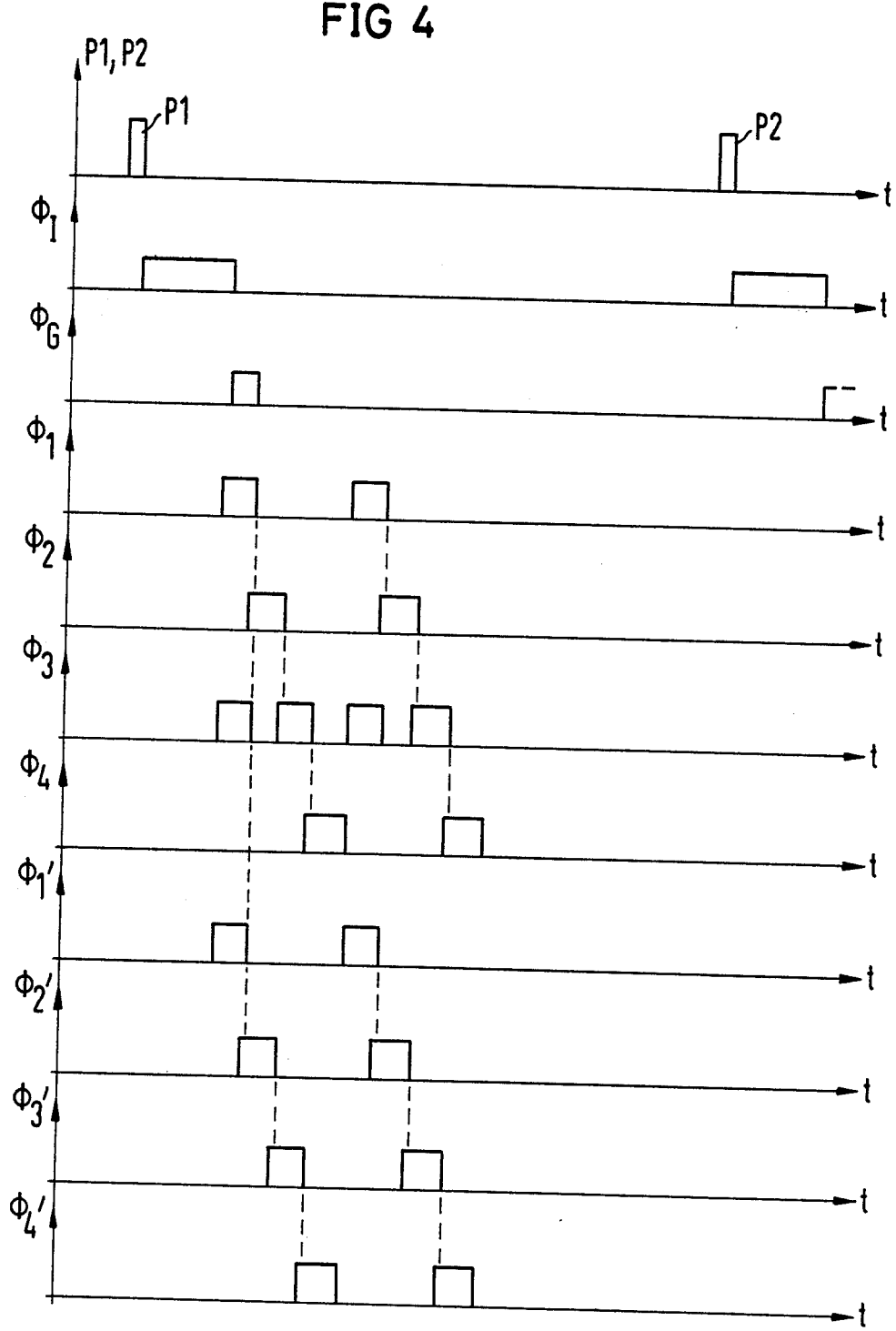
FIG. 4 is a time diagram illustrating the operation of the circuits illustrated in FIGS. 1 and 3.

In the operation of the system, following the occurrence of a pulse P1 which is supplied to an input 20a of the setting device 4, the latter is thereby set to a first discrete distance x of a setting sequence, and a pulse $\phi_I$ is connected to the electrode 34, which determines the so-called integration time of the image sensor. Within this integration time, under the influence of the optical illumination, electrical charges corresponding in value to the particular local illumination intensity accumulate at the image points 38 to 42 etc. A transfer gate pulse $\phi_G$ ensures that these charges are displaced in the direction of the arrows out of the image points into the area of the charge transfer devices 35 to 38. In other words, the charge formed beneath the area 39 is displaced beneath the electrode 361, the charge formed beneath the area 40 is displaced beneath the electrode 371, the charge formed beneath the area 41 is displaced beneath the electrode 353, and the charge formed beneath the area 42 is displaced beneath the electrode 384. The shift pulse trains $\phi_1$ to $\phi_4$ and $\phi_{1'}$ to $\phi_{4'}$ occurring at times as illustrated in FIG. 4, ensure that the electrical charges, following passage through the charge transfer devices, are advanced in stepped fashion beneath the electrodes 35g to 38g and finally reach the diffusion zones D1 to D4. The potential shifts taking place across the electrodes 35g to 38g are transferred over the amplifier 43 to the output 7 thereof where they produce an output signal u, which comprises consecutively occurring pulse-like components corresponding to the illumination intensities in the consecutively read-out image points during the integration time.

A pulse P2 supplied to the input 20a of the setting device 4 effects a setting to the next value x within the same setting sequence, following which a further pulse $\phi_I$ defines the integration period assigned to this setting. This integration period can also coincide with the displacement of the charges, formed in the preceding integration period, across the charge transfer devices 35 to 38.

An image sensor of the type above described is described in detail in German Patent No. 2,553,658. One way in which such exemplary embodiment of a CTD image sensor can be simplified is to eliminate the charge transfer devices 35 and 38, and effect a read-out merely over the devices 36 and 37, thus reducing the number of read-out image points by half, namely to the points 39, 40 and to the points which are spaced from these points by a distance corresponding to an arbitrary multiple of the distance of the image points 38 and 42 from one another. An image sensor of this kind is described, for example, in the publication "IBM Technical Disclosure Bulletin", Vol. 16, No. 1, June 1973, pages 173 and 174. It might be mentioned that in lieu of the charge transfer devices 35 to 38 which are to be considered as SCCD devices facilitating charge transport directly beneath the substrate surface, or BCCD devices facilitating charge transport inside the substrate, it is possible within the scope of the present invention to utilize bucket chain circuits, known per se (BBD). Both systems of charge transfer devices are described, for example, in the book "Charge Transfer Devices", by Sequin and Tompsett, Academic Press, New York, 1975, pages 1 to 18.

It will also be appreciated that it is possible, instead of utilizing charge transfer devices operating with four-phase operation, to employ devices which operate, in known manner, in two-phase or three-phase operation. Further, the central electrode 34 of FIG. 3 can also be divided into a row of electrodes corresponding to the parts 35 to 38, in which case all the electrodes in this row are initially supplied with a common pulse $\phi_I$ which defines the integration time, whereupon the individual electrodes are supplied with the shift pulses $\phi_1$ to $\phi_4$ as illustrated in FIG. 4. However, it should be insured that only the image points lying beneath each fourth electrode are illuminated. In the lastmentioned example, the amplifier 39 would be connected to the lower part of the electrode 34, which then represents a floating-gate electrode, and the charge devices 35 to 38 are omitted. In this case a continuous gate oxide zone is disposed beneath the split electrode 34.

Assuming that each electrode in the respective rows of electrodes 35 to 38 has a length of 10 μm, and 100 elements or image points 39, 40 etc. are provided, the length of the image sensor will be 1 mm. In this case, a read-out time of 0.1 ms corresponds to a repetition frequency of the shift pulse trains $\phi_1$ to $\phi_4$ of 1 MHz. Further, assuming that the integration time is on the order of 10 ms, the read-out time is negligible by comparison. Thus, a setting sequence of 50 individual steps, each of which must be assigned an integration time of 10 ms, has a time requirement of approximately 0.5 seconds. At the end of this period, the evaluating circuit B has determined the signal $u_3$ which automatically sets the system at the optimum distance x.

A particular advantage of the arrangement in accordance with the invention, when used in connection with photographic cameras and the like, resides in the fact that it can be implemented in the integrated semiconductor technique, with the possibility that it can be integrated with an automatic exposure device with photometry and diaphragm or shutter control facilities.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim as my invention:

1. In an arrangement for focusing the image of an object into an image plane, wherein the image is derived by means of an objective lens system, and a cooperable setting device which varies the distance between at least a portion of the lens system and the image plane, the combination of a CTD image sensor having a plurality of image points aligned with a part of the image plane, means forming an output for said sensor for providing a sequential read-out of the image point values, an evaluating circuit to which the output of said sensor is supplied, means in said evaluating circuit for forming integrated signals corresponding to the mutual contrast of the read-out image points for a sequence of discrete values of the distance x, between the objective lens system and the image sensor, and means in said evaluating circuit responsive to said integrated read-out signals for forming an adjusting signal in correspondence to such integrated read-out signals, which is usable as a criterion for the control of such setting means for said objective lens system to adjust the same to a distance x which provides an integrated read-out signal of greatest amplitude.

2. An arrangement according to claim 1, wherein the image points of the CTD image sensor are disposed in a linear configuration.

3. An arrangement according to claim 2, wherein the distance between adjacent image point of the CTD image sensor lies on the order of the resolution of the objective lens system.

4. An arrangement according to claim 2, wherein said means forming said output for the CTD image sensor comprises at least one read-out device, in the form of a charge transfer device, disposed at each side of the linearly disposed image points.

5. An arrangement according to claim 1, wherein said means in the evaluating circuit for forming integrated read-out signals comprises two differentiator stages, a rectifier stage and an integrator, which are serially connected with the output of said integrator supplying such integrated read-out signals.

6. An arrangement according to claim 5, wherein said means responsive to said integrated read-out circuit comprises a selection stage for determining the time of occurrence of the integrated read-out signal having the greatest amplitude, and means for forming an adjusting signal representative thereof which represents the output of said evaluation circuit, means for storing a series of adjusting signals, and means for addressing individual members of such series, wherein only the adjusting signal which occurs at the aforementioned time will be supplied to the output of the evaluating circuit.

7. An arrangement according to claim 5, wherein said selection stage comprises a first scanning stage and a comparator, said means forming said adjusting signal comprising a second scanning stage and a triggerable generator which supplies a rising or falling voltage curve, the output of said integrator being connected to the signal input of the first scanning stage and to the first input of the comparator, the output of said first scanning stage being connected to the second input of the comparator with the comparator output being connected to the control input of said two scanning stages, the signal input of the second scanning stage being connected to the generator and the output of the second scanning stage forming the output of the evaluating circuit.

8. An arrangement according to claim 6, wherein the selection stage contains a first scanning stage and a comparator, the means for storing, adjusting signals comprising a store and the means for addressing the store with timing pulses comprising a counter, means for supplying the latter with timing pulses, a gate circuit, the output of the integrator being connected to the signal input of the first scanning stage and to the first input of the comparator, the output of the first scanning stage being connected to the second input of the comparator with the output of the latter being connected to the control input of the first scanning stage and to the first input of the gate circuit, the second input of the gate circuit being connected to the output of the counter, and the output of the gate circuit being connected to the address input of the store, with the output of the latter supplying the addressed, stored items of information forming the output of the evaluating circuit.

9. An arrangement according to claim 1, wherein the evaluating circuit is so constructed that, following each setting of the distance x carried out by means of the adjusting signal, a further sequence of integrated read-out signals is automatically formed and is maintained at discrete values of the distance x during a further setting sequence.

10. An arrangement according to claim 7, wherein the CTD image sensor is monolithically integrated, together with the evaluating circuit, on a semiconductor substrate.

11. An arrangement according to claim 8, wherein the CTD image sensor is monolithically integrated, together with the evaluating circuit, on a semiconductor substrate.

12. An arrangement according to claim 1, comprising in further combination, a measuring circuit connected to the output of the evaluating circuit for determining the distance of an object to be reproduced on the image plane from the objective lens system.

13. An arrangement according to claim 12, wherein the measuring device includes means for selectively determining that the object which is to be reproduced has reached a given distance from the objective.

14. An arrangement according to claim 12, wherein the measuring device includes means for determining the interval of time between the points at which the object reaches two given distances.

* * * * *